Aug. 24, 1926.

G. C. ANDERSON 1,597,419

GAME APPARATUS AND APPURTENANCES

Filed Feb. 18, 1924    6 Sheets-Sheet 1

Witnesses.
O. F. DuBois.
H. H. Bigg.

Inventor.
GEORGE C. ANDERSON.
by Atty N. DuBois.

Aug. 24, 1926.

G. C. ANDERSON 1,597,419

GAME APPARATUS AND APPURTENANCES

Filed Feb. 18, 1924     6 Sheets-Sheet 2

Witnesses.
O. D. DuBois.
H. H. Biggs.

FIG. 4.

Inventor.
GEORGE C ANDERSON.
by Atty N. DuBois.

Aug. 24, 1926.  
G. C. ANDERSON  
1,597,419  
GAME APPARATUS AND APPURTENANCES  
Filed Feb. 18, 1924   6 Sheets-Sheet 3

Witnesses  
O. D. DuBois,  
N. H. Biggs

Inventor:  
GEORGE C. ANDERSON.  
by Atty N. DuBois.

Aug. 24, 1926.  1,597,419

G. C. ANDERSON

GAME APPARATUS AND APPURTENANCES

Filed Feb. 18, 1924    6 Sheets-Sheet 4

Aug. 24, 1926.

G. C. ANDERSON 1,597,419

GAME APPARATUS AND APPURTENANCES

Filed Feb. 18, 1924   6 Sheets-Sheet 6

Witnesses.
O. D. Du Bois.
H. H. Briggs.

Inventor
GEORGE C. ANDERSON.
By Atty N. Du Bois.

Patented Aug. 24, 1926.

1,597,419

UNITED STATES PATENT OFFICE.

GEORGE C. ANDERSON, OF SPRINGFIELD, ILLINOIS.

GAME APPARATUS AND APPURTENANCES.

Application filed February 18, 1924. Serial No. 693,547.

The game apparatus and appurtenances have been devised and constructed for playing an original game which I call "Ex-ci-te-me-nt".

Briefly stated, the invention includes a box or housing having a removable cover externally ornamented to indicate the name and nature of the game; a base of new and useful construction having an outer wall surrounded by the cover, an interior circular wall bounding a central chamber housing a number of instruments and an outer circular chamber located between the outer and inner circular walls, housing various other instruments of the game when not in use; a circular ring fitting loosely in the central chamber and supporting the pit at the proper height; an ejector rotative on a suitable support in the pit; a game-field of new and useful construction, rotative around the outer vertical wall of the base and provided with corrugations facilitating the rotation of the game-field; and various instruments used in various ways in playing the game, as will be described later.

I will describe first the box or container, the game field and the ejector, and will describe later in succession, the various instruments used in playing the game.

The purposes of the invention are; to provide a new and interesting game comprising a box or housing containing the operating parts of the apparatus and also containing a variety of different instruments preferably stowed in the box when not in use; to provide suitable apparatus to be operated in playing the game; to provide a game-field of improved construction; to provide a number of instruments of different forms and different constructions, all contributing in some way to the "count" on the game-field and effective in various ways to spell the characteristic word "excitement", and to provide other new and useful features of construction, as will hereinafter appear.

The invention is illustrated in the accompanying drawings to which reference is hereby made.

The same reference numerals designate the same parts in all the views.

The main box or container 40 and its cover 36, the game-field and the pit will preferably be made of pressed card board or other light material having sufficient rigidity. The base 40, is a circular box having an outer circular wall 41, an inner vertical circular wall 42 bounding a central chamber 43; the box has also an outer circular chamber 44 between the walls 41 and 42. Various instruments for playing the game will be stowed in the chambers 43 and 44 when the apparatus is not in use and will be removed from the chambers when needed for use.

The game-pit 46 is a circular box-like structure supported at the proper height in the chamber 43 by the ring 45. The ring may be reversed to occupy the position shown in Fig. 3 in order to make more room available for stowing instruments in the chamber 43. The pit has a flat circular rim 47 on which are six groups of letters. The letters of the respective groups are arranged as shown to spell "ex-ci-te-me-nt".

The pit has on its inner vertical wall 48, five groups of numerals, each group consisting of the six numerals "1, 2, 3, 1, 4, 5" arranged in the order stated.

A reversible pit disc 49 rests on the bottom of the pit. The obverse face "A" of the pit disc (Fig. 8) is divided into thirty equal sectors by lines 60 radiating from the center. The sectors comprise the numbers "1, 2, 3, 1, 4, 5" arranged in five groups each group containing six numerals corresponding to the numerals on the inner vertical wall of the pit. When the face A is uppermost in the pit five balls will be used, as described later. If every ball registers with the highest number "5" the maximum possible score on the gamefield, for the five balls in the pit at one time will be $5 \times 5 = 25$.

Figures 6, 7, 8, 9, 20, 21:
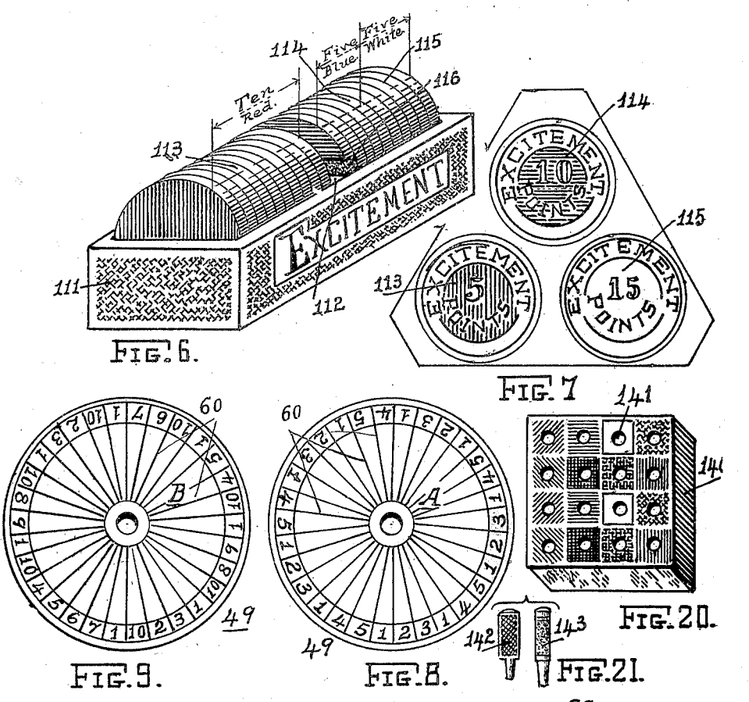
Fig. 6 is a perspective view of the counting-disc-case containing one set of counting discs.
Fig. 7 shows three counting discs of different values.
Fig. 8 is an obverse view of the reversible numbered disc used in the pit.
Fig. 9 is a plan view of the reversed face of the numbered disc.
Fig. 20 is a perspective view of the host's peg-box showing sixteen holes adapted to receive eight color-pegs and eight gilt-pegs.
Fig. 21 is an enlarged perspective view of one duplicate color peg and one gilt peg.

The numerals on face A of the pit disc being identical with the numerals on the inner wall of the pit are used only to facilitate the reading of the counts by the players sitting around the table, the numerals on the pit wall being more convenient for some, and the numerals on the face A of the disc being more convenient for others.

The face B of the pit disc is similarly divided into 30 equal sectors containing a circular series of irregularly arranged numerals in which the numeral 1 occurs seven times; the numeral 10 occurs seven times; and each of the numerals 2, 3, 4, 5, 6, 7, 8 and 9 occurs twice. When playing with five balls in the pit and the face B of the pit disc uppermost, the highest possible count will be made when each ball is in line with a corresponding numeral "10" in the circular series of numerals, making the maximum possible count at any single turn of the ejector, $5 \times 10 = 50$. Inasmuch as face B of the pit-disc co-operates with the guessboard Fig. 26, it is necessary to provide in the numbered zone of the guess-board a number corresponding to every number that can be indicated at one play, by the five balls in the pit. In the present case the highest number in the numbered zone of the guessboard is 50.

*The thrill-box.*

The thrill-box 39 is a device used to contain and tumble cubes used in playing the game. The thrill-box (Figs. 29, 30, 31 and 32) comprises a hollow base 78, containing a weight 79 which steadies the box, and box-like members 80 and 81 connected with the base by flexible hinges 82. Rubber bands 83 have one end secured on the base and the other end secured on the respective members 80 and 81. The closing of the box stresses the bands. The base has a lengthwise partition 84 and each half of the base 78 and each of the members 80 and 81 has four transverse partitions 84, dividing each half of the base and each of the members 80 and 81 into five equal compartments 85 each of which receives a cube. Resilient latches 86 and 87 are centrally located on the respective members. The latch 87 has at its outer terminal a double barb-like hook 88 which is colored red on its upper face. The latch 86 has a terminal double barb-like hook 89 colored green on its upper face. The latch 86 has an upwardly extending angular presser plate 90 colored red on its upper face and the latch 87 has a similar presser plate 91, colored green on its upper face. When the box is closed, the hooks 88 and 89 interlock to keep it closed. The hinges, 82 being flexible, the hook 88 will sometimes ride on the hook 89, and at other times the hook 89 will ride on the hook 88. When the hook 89 happens to be uppermost as shown, it will ride on the hook 88 and the green upper face of the hook 89 will indicate that the green presser plate 91 is to be pressed to disengage the hooks; on the other hand, when the hook 88 happens to be uppermost, it will ride on and engage the hook 89 and the upper red surface of the hook 88 will be visible to indicate that the red presser plate 90 is to be depressed, to disengage the hooks. This signal device enables the operator to know instantly which presser plate must be depressed to disengage the latches and relieves him of the confusion of trying first one presser plate and then the other, before he can be sure which one will operate to disengage the latches.

Figures 29, 31, 33, 34, 35:
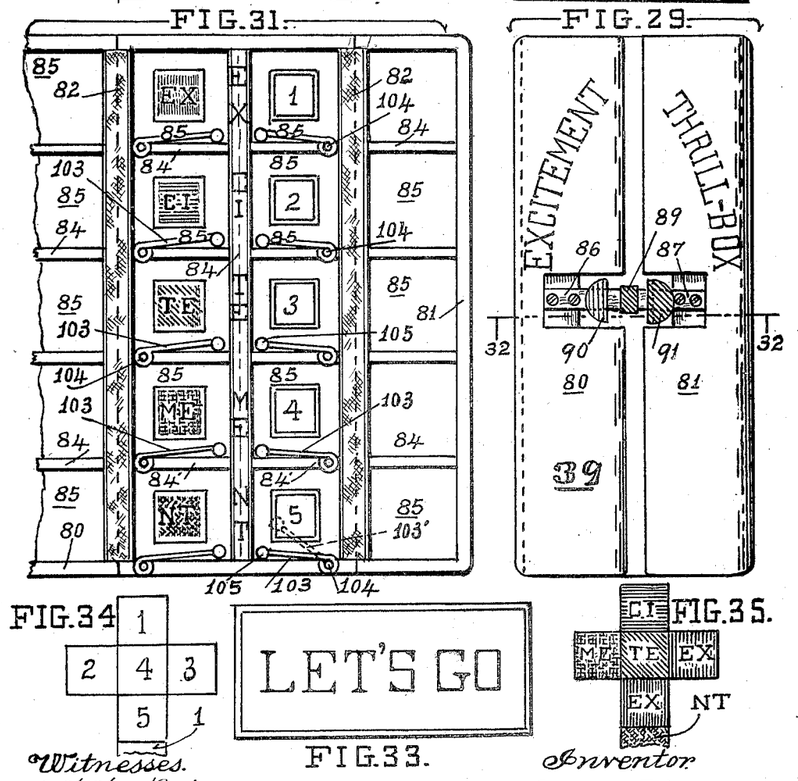
Fig. 29 is a top view of the closed thrill-box.
Fig. 31 is a top view of the open thrill-box.
Fig. 33 is a reduced bottom view of the thrill-box.
Fig. 34 is a developed plan of one of the numbered cubes used in the thrill-box and Fig. 35 is a developed plan of one of the lettered cubes used in the thrill-box.
Figures 30, 32:
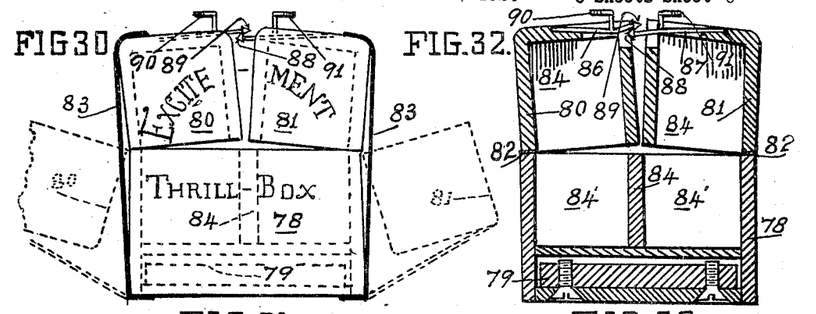
Fig. 30 is an end view of the same thrill-box.
Fig. 32 is a vertical section through the thrill-box taken on the line 32—32 of Fig. 29.

The compartments 85 have sufficient capacity to permit the cubes in the respective compartments to tumble freely when the box is shaken lengthwise and laterally.

The compartments in one box-member contain lettered cubes which I call "excitement" cubes and the compartments in the other box-member contain numbered cubes. Each face of each lettered cube differs in color from every other face except one, of the same cube. In the present instance each lettered cube has a red face, a blue face, a green face, a yellow face, and an orange face but obviously other colors may be used. Each cube has on its various faces five different colors, the sixth face being a duplication of one of the colors. The duplicated color on the sixth face is however different on each cube; thus making on the 30 faces of the 5 cubes, six groups of five faces each of different color. In the present instance each red face of each of the cubes bears the letters E X, each blue face of each cube bears the letters C I, each green face of each cube bears the letters T E, each yellow face of each cube bears the letters M E, and each orange face of each cube bears the letters N T, so that when the exposed faces of the lettered cubes are each of different color it will be known at a glance that they spell "excitement."

The counting cubes are all of the same color and the faces of each cube are numbered 1, 2, 3, 4, 5, and 1 respectively. When a player shakes the box to tumble the cubes, and the box is opened, the player will tally on the game field a number of points equal to the total of the numerals on the upper faces of the cubes in the box, and if the lettered cubes spell "excitement" he also receives 15 points in counting discs from each other player.

To assure that the box will always be thoroughly shaken to tumble the cubes in all the compartments the inscription "Let's go" is placed on the outside of the bottom of the box. The person using the box will invert the box after shaking, to show to all the players that it has been properly shaken.

The ball fountain.

Figures 12, 13, 14, 15, 16, 17, 19:
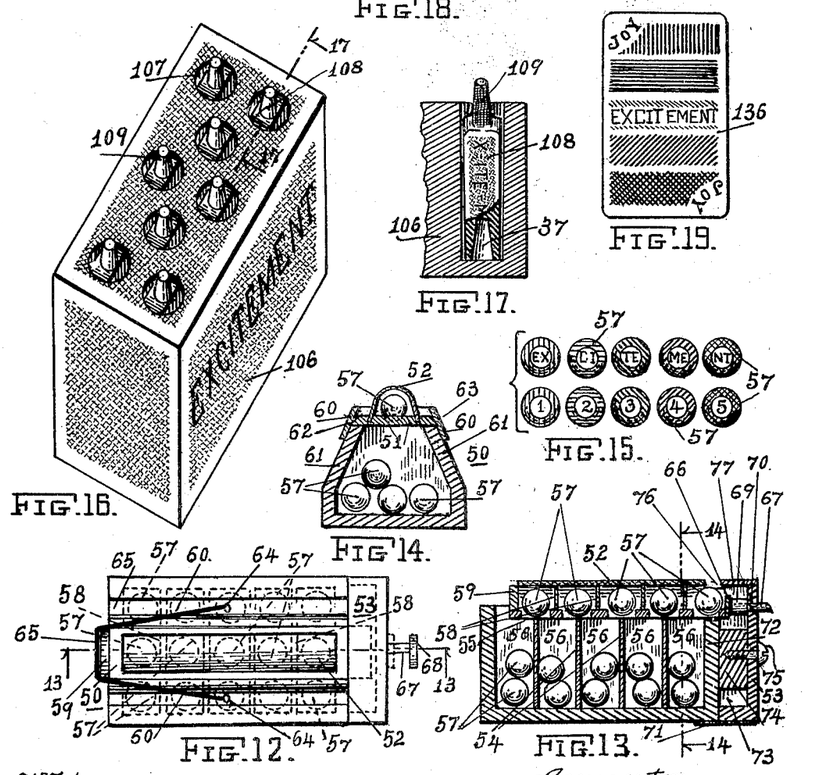
Fig. 12 is a top view of the ball-fountain.
Fig. 13 is a vertical section through the ball-fountain taken on the line 13—13 of Fig. 12 showing balls in place in the fountain and in the tube.
Fig. 14 is a vertical transverse section through the ball-fountain taken on the line 14—14 of Fig. 13.
Fig. 15 is a diagrammatic view of five balls used in the ball-fountain.
Fig. 16 is a perspective view of one color-peg-box showing the pegs in position in the box.
Fig. 17 is a vertical section through the color-peg-box taken on the line 17—17 of Fig. 16.
Fig. 19 is a top plan of the "joy" card.

The ball fountain is an appliance designed to contain balls used in playing the game, to shake them and to expose them to view, so that the players, as each player has his turn at the ball fountain, may see the result of his play. The ball fountain is preferably made of pressed cardboard, or other light material of suitable strength, and comprises the rectangular box 50 having sloping slides 61. The box supports at its upper end a slide 51, and has four vertical transverse partitions 54 which divide the box into five compartments 56, each containing a group of balls 57 to be described later. The slide 51 has at one end (in the present instance the left hand end) an upwardly extended member 59 attached to and moving with the slide. The member 59 closes the adjacent end of a transparent view-tube 52, which is part of the slide. The slide has also five openings 55 corresponding to the respective compartments in the box, it also has transverse bars 58 in the view-tube and corresponding to the respective partitions 54 in the box when the slide is at the limit of its inward movement, as shown in Fig. 12. On the sloping sides of the box are lengthwise guide rails 60 parallel to each other. The guide rails have V-shaped lengthwise grooves 62 receiving the chamfered edges 63 of the slide. Nails, or pins 64 are fixed in the side rails opposite to each other. A rubber band 65, or other suitable elastic slide-actuating-device has its respective ends attached to the nails and its central part engages on the member 59. When the slide is at the limit of its inward movement, the band will be stretched and when pressure on the outer end of the slide is removed, the band will act to move the slide outwardly, to such position that the partitions 54 will lie across the respective openings 55 and will support balls which are then visible in the tube, as described later.

The slide has at its outer end a contact plate 66. A plunger 67 in line with the center of the contact plate 66 slides in a hole 70 in the door 53. The plunger has at its outer end a knob or button 68 used to push the plunger inwardly, and has at its inner end a fixed collar 69 limiting outward sliding of the plunger. A flexible hinge 71 connects the door 53 with the floor of the box.

A recess 73 in the stock of the door accommodates a block 74, which is secured on the end wall 72 of the box. A screw 75 extends through the door and connects the door with the block 74. When it is desired to open the door, the screw will be removed. When the door is open and the rubber band is detached from the member 59 the slide may be moved outwardly to give access to balls in the compartments of the box. After putting in, or taking out balls, the door will be closed and the screw will be again used to secure the door in its closed position.

Part of the view-tube at its end adjacent to the door is cut away to leave space 76, to permit the view-tube to travel outwardly under the inwardly extending part 77 of the door.

Each compartment of the box contains a group of five balls 57. The balls in each group are all of different colors and are numbered from one to five inclusive. The same five colors are used in each group. In the present instance the colors are red, blue, green, yellow and orange; but other colors may be used without departure from my invention. Each ball in each group has, in addition to the numerals already mentioned, two letters which are part of the word "excitement". The arrangement of the balls in the several groups are as follows: For example, in the first group the red ball will be numbered 1; the blue 5, the green 4, the yellow 3, and the orange 2; In the second group, the red ball will be numbered 2, the blue 1, the green 5, the yellow 4, and the orange 3; in the third group, the red ball will be numbered 3, the blue 2, the green 1, the yellow 5, the orange 4; In the fourth group, the red ball will be numbered 4, the blue 3, the green 2, the yellow 1, and the orange 5; and in the fifth group, the red ball will be numbered 5, the blue 4, the green 3, the yellow 2, and the orange 1. The letters on the respective balls are similarly placed with reference to the color of the ball. That is to say, "E X" will be on the red ball of each group; "C I" on the blue ball of each group; "T E" on the green ball of each group; "M E" on the yellow ball of each group; and "N T" on the orange ball of each group. It is to be noted that if the balls visible in the tube at one time are all of different colors, it will be known, without inspecting each ball separately, that the letters on the visible balls spell the word "excitement". The colors of the balls, the numbers on the balls and the letters on the balls all have counting value. If the balls visible in the view-tube at one time are all of different colors, they will spell "excitement" and the player will receive 15 points in counting discs from each other player and will advance his color peg on the game field according to the sum total of the numerals of the balls in the tube, and in addition will advance his color peg on the game field five more points, if the balls visible in the tube are in the numerical sequence, 1—2—3—4 and 5; or if all the visible balls have the same numeral, he will likewise advance his color peg five points on the game field.

Having described the construction of the ball-fountain, and the colors, the lettering, the numbering, and the grouping of the balls; the mode of using the ball-fountain and balls in cooperation with the pit, the game field, the player's color pegs and the counting discs will be described later.

Peg box and color pegs.

The game may be played by eight players or less. In order to accommodate the maximum number of players I provide a color-peg box 106 accommodating eight pegs shown in Figs. 16 and 17. The box is of wood and has a series of vertical bores 107. Each bore contains a color-peg 108. The pegs are of all different colors in order to identify the respective players using the pegs. Each color-peg has an upwardly extending integral pin 109 and a central hollow 37 to receive the pin 109 of any other color peg when one peg is placed on top of another, so that one hole in the game-field may be utilized for two or more pegs. The pins 109 are all of one color, preferably black. While the pegs are in the bores the colors of the pegs will not be visible, the drawer therefore cannot select a color but will draw at random.

Preparatory to commencing the play the peg-box will be passed around and each player will draw an identifying color-peg. During the playing of the game he will place the pin 109 of his color-peg in the proper hole in the game field to score his count of points, and will advance it from time to time into the proper holes in the game field, so that the final position of his peg on the game field will score his total count at each stage of the game.

Ejector.

Figure 10:
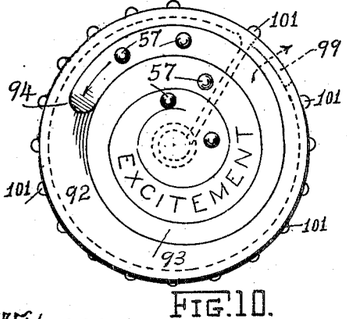
Fig. 10 is an enlarged top view of the ejector.
Figure 11:
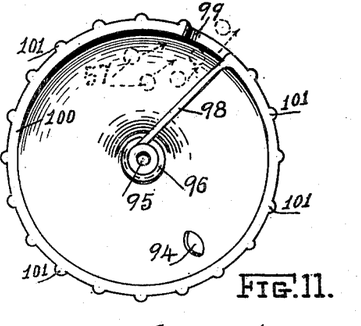
Fig. 11 is an enlarged inside view of the ejector.

The ejector shown in Figs. 10 and 11 is preferably a hollow, metal casting in the form of a frustrum of a cone. The body 92 has a spiral run-way 93 extending from the top downwardly around the body and terminating in an opening 94 which communicates with the interior of the body and permits balls, running downward on the runway to enter the interior of the body. A conical depression 95 in the inside hub 96 received the upper end of a vertical pivot 97 which is stationary at the center of the pit 46. The ejector rotates freely on the pivot. A sweep or ejecting arm 98, integral with the body and approximately tangent to the hub 96, engages balls 57, inside the ejector to sweep them outwardly through the outlet opening 99 in the circular wall 100 and disperse them on the pit where they finally stop between radial corrugations 102 on the floor of the pit. Protuberances 101 on the circular wall 100 facilitate the rotating of the ejector by hand. The body 92 is of such weight that when twirled by hand it will rotate evenly and its momentum will be sufficient to cause the ejecting of the balls through the opening 99 without seriously retarding the rotation of the ejector.

The five balls used in the ejector are exactly like the five balls grouped Fig. 15. When using the ejector one group of balls taken from the ball fountain may be used; but other balls may be used with the ejector. When using the ejector the reversible pit-disc Figs. 8 and 9 will be placed in the pit with its face "A" uppermost. The player will rotate the ejector by hand and drop the balls on the rotating ejector which will deliver them in the pit. When the balls come to rest in spaces between corrugations on the pit bottom the numeral on the circular vertical inner wall of the pit or on the disc opposite the respective balls will be noted; the sum total of said numerals will be taken and the player will score by placing his color-peg in the correspondingly numbered hold in the game field. If the positions of the balls spell "ex-ci-te-me-nt" as indicated on the upper rim of the pit, the player will also receive 15 points in counting discs from each other player. In the second method of using the ejector described later the reversible disc will be placed in the pit with its face "B" uppermost and will be used in cooperation with the guess-board as will be hereafter described.

The disc-containers and the discs therein, are used in playing various stages of the game as will hereinafter appear. The outfit shown and described comprises eight containers each having a complement of twenty discs.

The containers are all alike except as to color; a description of one will therefore suffice for all. Each container has its own distinctive color, red, blue, green, yellow, orange, brown, black or white as the case may be.

In Fig. 6 I have shown a container of orange color.

The container 111 has a transverse partition 112 dividing it into two compartments each containing ten discs. One group of discs shown in Fig. 7, comprises red discs each counting five points; blue discs each counting ten points; and white discs each counting fifteen points. Ten red discs 113 are indicated in one compartment of the container and five blue discs 114 and five white discs 115 are contained in the other compartments. A player's color-peg 116 corresponding to the color of the container (in the present case orange) is supported on the partition 112 where it is readily accessible when needed.

When beginning the play the disc-containers will be distributed to the players and each player will receive the disc-container of the same color as his color-peg. The discs have counting value only when the apparatus proper and the co-acting instruments, spell the word "excitement." For examples: When playing with the ejector and balls delivered by it into the pit, the balls occupying the spaces between corrugations on the pit floor which spell the word "excitement", the player will receive 15 points in counting discs from each other player; likewise when playing with the guess-board the player will receive fifteen points in counting discs from each other player. When playing with the ball-fountain, if the colors of the balls visible in the view-tube are all different they will spell "ex-ci-te-me-nt" and in that case the player will receive fifteen points in counting discs from each other player. If the cards in any player's hand spell "ex-ci-te-me-nt" or if the jazarets drawn by him, spell "ex-ci-te-me-nt"; or if the exposed lettered faces of the cubes in the thrill-box spell "ex-ci-te-me-nt"; he will in each case, receive fifteen points in counting discs from each other player. The final winner of the game will be the player to have the greatest number of points in counting discs.

The host's peg box and pegs, shown in Figs. 20 and 21, are used in cooperation with the guess-board, to be described later. The box 140 is a rectangular block, preferably of light wood, having sixteen vertical bores 141, eight of which receive eight duplicate color pegs 142, of the same colors as the players' color-pegs already described; and eight of which receive eight gilt pegs 143.

Each duplicate color peg identifies a player and has its own distinctive color, different from the color of any other duplicate color peg. The manner of using the duplicate color pegs and the gilt pegs will appear in the description of the guess board.

Figure 1:
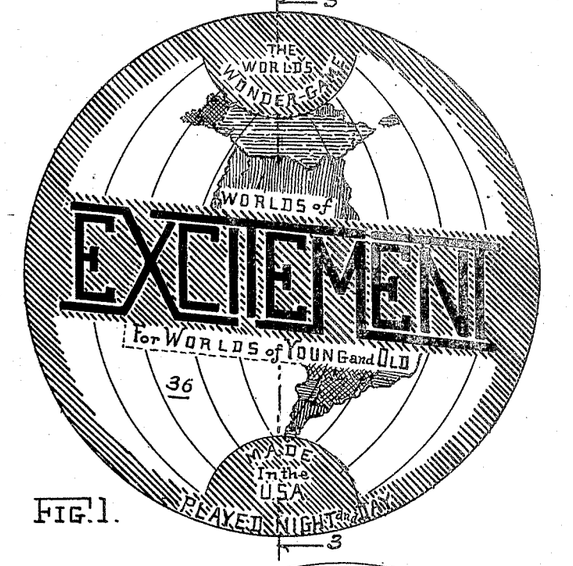
Figure 1 is a top plan of the complete apparatus.
Figure 2:
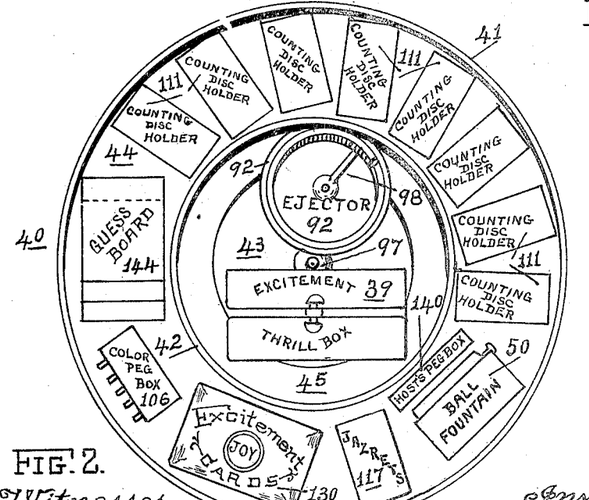
Fig. 2 is a top view of the same apparatus, without the cover and the game-field which are omitted to show clearly the various instruments housed in the box.
Figure 18:
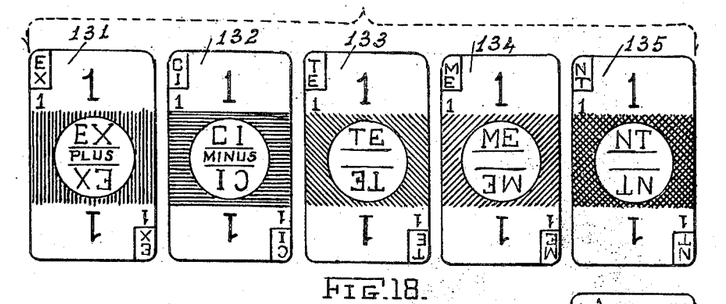
Fig. 18 is a plan view of one group of playing cards of different colors.

A deck 130, of playing cards (Figs 2, 18 and 19) comprises fifty color-cards arranged in ten groups of five cards each, and one additional card 136 which I call the "joy" card, comprising all of the colors; making fifty one cards in all. The groups are numbered from 1 to 10 inclusive and are all alike except the numbering of the cards. In Fig. 18 I have shown group 1 of the cards; in which card 131 is red, 132 is blue, 133 is green, 134 is yellow and 135 is orange. It is to be noted that the colors of the cards comprised in the group are all different. I do not however restrict the claims to the precise colors shown, since it is obvious that five other different colors may be used without departure from my invention. The cards in the first group, shown in Fig. 18 are all numbered "1"; the cards in the second group will all be numbered "2"; the cards in the third group will all be numbered "3"; and so on for each of the ten groups. Card 131 has letters "E X"; 132 has letters "C I"; 133 has letters "T E"; 134 has letters "M E" and 136 has letters "N T"; which when combined spell the characteristic word "excitement". In the present instance card 131 bears the word "Plus"; and card 132 bears the word "Minus", but the words "Plus" and "Minus" may be on any other two cards of the group; and in each of the other groups one card has "Plus" and another card has "Minus". In two of the groups the card marked "E X" will also be marked "Plus"; in another two of the groups the card marked "E X" will also be marked "Minus"; and in the other six groups the cards marked "E X" will not be marked either "Plus" or "Minus", and the same marking of the "Plus" and "Minus" will be on the cards marked "C I" "T E" "M E" and "N T". The joy card comprises all the colors of a group and also bears the word "Excitement" and may be used as the equivalent of any card in the deck and counts for any number, for any two letters without plus or minus, for any two letters either plus, or minus; and for any color. The object of the player is to form combinations, by drawing, in his turn from the deck or the discard and discarding from her hand, to obtain cards, all the same color, all the same numeral, all the same letters, all in the same numerical sequence 1, 2, 3, etc.; or to spell "excitement-plus", or "excitement-minus" and count accordingly on the game field. The cards described are capable of a very large number of combinations in the hands of a single player for present purposes it will suffice to enumerate some principal possible combinations:

Five of the same color mixed as to "plus," "minus" and neither.

Five of the same color all plus.

Five of the same color all minus.

Five of the same color neither plus or minus.

Five of the same number under the same headings as above.

Five of the same letters under the same headings as above.

Five in sequence under the same headings as above.

Five spelling "ex-ci-te-me-nt" under same headings as above.

Five spelling excitement, and also in sequence.

Five spelling excitement, and in sequence with the joy card high.

Five spelling excitement and in sequence with the joy card high and all plus, and so on.

The combinations enumerated above, all have counting values on the game field and in counting discs.

Counting devices, to which I have given the distinctive name "jaz-r-ets" (Figs. 23, 24 and 25) are used in playing the fifth stage of the game, hereinafter described. A suitable box 117 preferably of pressed card board, contains twenty five jaz-r-et units of any suitable material. A lid 118 is connected with the box by a flexible hinge 119. The box is of such size as to permit free shaking of the jaz-r-ets in the box to change the position of all the units at each shaking, to assure a fair drawing of the units after each shaking. The construction of all the units is the same, except as to the color, the letters and the numerals on the color discs, to be described later; a description of the mechanical construction of one unit will suffice for all. Each unit comprises two approximately oval members 121 and 122 connected by an eyelet 123 forming a pivotal connection of the members such that when the jaz-r-et is closed the members will lie face to face but permitting manual operation of the members to rotate them on the eyelet to the position shown in Fig. 23 to expose the color discs in the respective members. Each member of the unit has an integral handle 124. Upon passing the handles towards each other the members will turn away from each other as shown. The member 121 has an external protuberance 125 and a corresponding depression 127 resulting from pressing the stock of the member outwardly to form the protuberance; and the member 122 has a similar protuberance 126 and a similar depression 128. Color discs 129 preferably of celluloid, lie in the respective depressions 129 and are thereby protected from abrasion during the rotation of the members. Both members 121 and 122, are the same color, preferably black on the outside.

The jaz-r-et units are in groups of five and each group comprises five different colors preferably red, blue, green, yellow and orange as indicated, but the color discs of any single group are all different. The color discs in the respective groups are numbered 1 to 5 inclusive; one color disc has the letters E X, another has C I, another T E, another M E, and another N T, so that the letters comprised in the group admit of spelling the characteristic word "excitement."

To use the jaz-r-ets, each player will take the box, in his turn, will shake it to mix the units and will then draw five units from the box and will operate the handles 124 to rotate the members 121 and 122 to expose the color discs 129 and will then place face uppermost, the five units which he elects to count and will then advance his color peg on the game-field a number of points equal to the sum of the numerals on the exposed faces of the color discs; if the exposed color discs are all the same color, or all have the same numeral, he will score five additional points on the game field; and if the letters on the exposed color discs are combinable to spell "excitement" he will also receive fifteen points in counting discs, from each other player. And so on for each of the players in succession.

Figures 22, 23, 24, 25, 26, 27, 28:
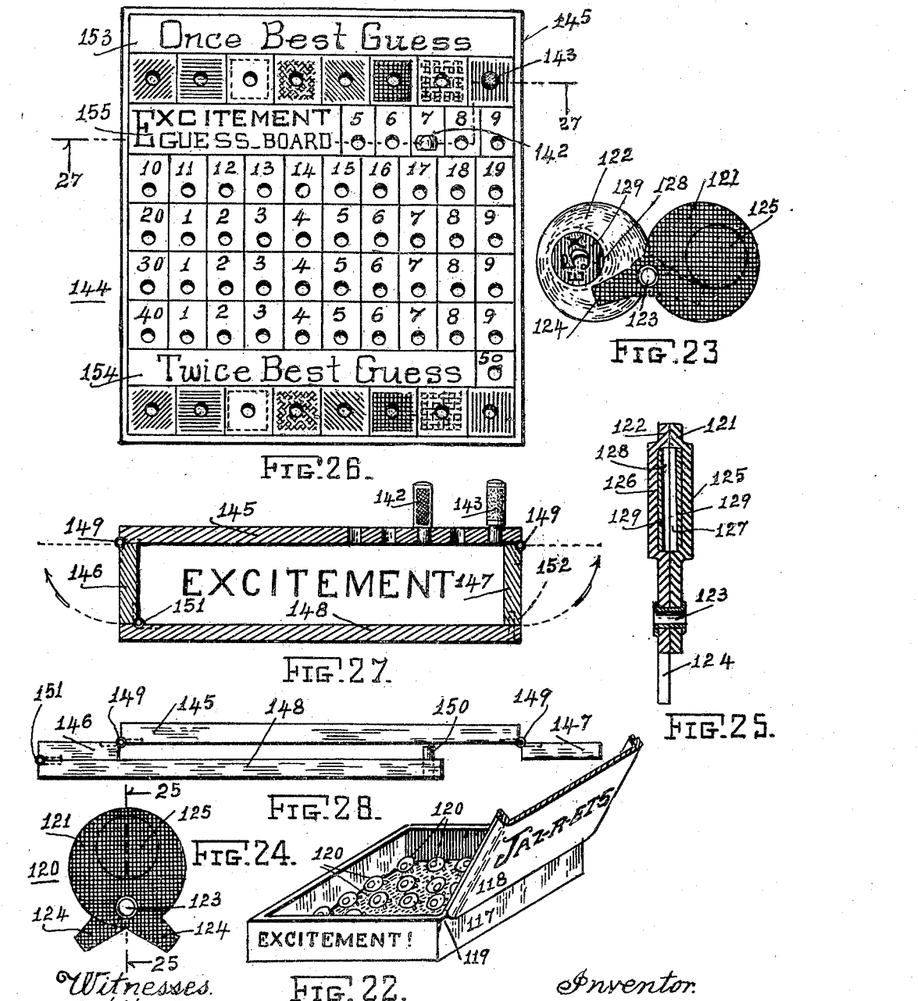
Fig. 22 is a perspective view of the "jaz" box containing one set of twenty-five "jaz-r-ets"
Fig. 23 is an enlarged plan view of one open jaz-r-et.
Fig. 24 is a plan view of one closed jaz-r-et.
Fig. 25 is an enlarged vertical section through the closed jaz-r-et taken on the line 25—25 of Fig. 24.
Fig. 26 is an enlarged top plan of the guess-board.
Fig. 27 is a vertical section through the guess-board taken on the line 27—27 of Fig. 26.
Fig. 28 is an edge view of the folded guess-board.

The guess board shown in Figs. 26, 27 and 28 is an appliance to enable the players to compete for the distinction of making a "once best" guess, or "once best" guesses; or making a "twice-best" guess, or "twice-best" guesses, or both "once-best" and "twice best" guesses, on the guess board, in a manner to be described later.

The guess board, designated as a whole by the numeral 144, is a light wooden structure comprising a flat table 145, and pieces 146 and 147 connected with the table by hinges 149; and a bottom plate 148 connected with the end piece 146 by a hinge 151. A dowel pin 150 fixed in the plate 148 engages in a hole 152 in the piece 147 to keep the assembled parts in the position shown in Fig. 27 while the guess board is in use. When not in use the appliance may be folded for stowage by withdrawing the pin 150 from the hole 152 and turning the parts on their hinges to the position shown in Fig. 28.

The table 145 has on its face a "once best" color zone 153, comprising eight rectangular areas, colored brown, blue, white, orange, green, black, yellow and red respectively; a "twice best" color zone 154 comprising eight rectangular areas having the colors arranged in the same order as the colors in the "once best" color zone; and an intermediate numerical zone 155 comprising rectangular areas numbered 5 to 50 inclusive. Each color area and each numerical area has a hole to receive a duplicate color peg or a gilt peg as the case may be. The colors in the color areas correspond to the colors of the players' color pegs in order to identify each player by his distinctive color area on the guess board.

In order that the play may proceed in an orderly and satisfactory manner, I provide means whereby each individual player may be identified, and means whereby the nature and result of each individual move may be shown and counted or recorded.

The moves in playing the game are of two kinds. First the plays which result in spelling "excitement" which are settled by the transfer of counting discs from each other player, to the player whose play results in spelling "excitement;" and second the moves which are counted on the game field by pegs which by their color identify the player and by their position on the game field score the points made by him.

The words plus or minus on some of the cards carries the usual significance of the words respectively, for example any combination made up of cards all marked Minus; five points will be deducted from the ordinary counting value of the hand; while any combination composed of cards all marked Plus, five points will be added to the ordinary value of the hand.

From the foregoing description it is apparent that the main structure comprises a chambered base; a rotative game-field having a pit with color designations, letters and numerical designations, a pit; an ejector rotative in the pit; color pegs identifying the respective players; and a cover embodying ornamentation suggestive of the scope and interest of the game and that all of the appurtenances shown and described cooperate with the main structure or with essential elements thereof; some in one way, others in other ways but all in some way to produce the various results set forth; as will be specifically recited in the claims.

In Fig. 31, number 103 is a resilient metal stop, connected with the box by a pivot 104, and having a knob or handle 105, used to move the stop 103 over t[he] shown at 103', to hold it while other cubes can be tumble[d] ently of the cube or cubes thus hel[d] stops. This permits of players having than one shake at each turn in which to for[m] combinations with the cubes.

Playing the game.

The equipment shown and described is sufficient for eight persons to play at one time but a less number may play with equal facility. The game may be played at a single table, or may be played progressively at a number of tables, as is usual with many games. A single complete playing of the game is performed in six successive stages now to be described.

*First stage.*—At the outset the host will pass around the color-peg-box and each player will draw a color-peg to be used to identify and designate his score on the game-field. The host will also deliver to each player the counting-disc-holder of the corresponding color containing twenty counting discs totaling 175 points. The first stage will be played with five balls taken at random from the ball-fountain and used in the ejector in the pit. The numbered pit-disc will be placed in the pit with its face "A" uppermost. The first player will rotate the ejector by hand and drop the balls into the ejector which will deliver them into the pit. When the balls come to rest in the spaces between the corrugations on the pit-bottom, the numerals on the circular vertical inner wall of the pit, opposite the respective balls will be noted, the total of said numerals will be taken and the player will score by placing his color-peg in the correspondingly numbered hole in the game-field. If the positions of the balls spell "ex-ci-te-me-nt", as indicated on the upper rim of the pit, the player will also receive fifteen points in counting discs from each other player. And so on for the other players in succession.

*Second stage.*—The second stage will be played with the same five balls; the reversible disc will be used in the pit with its face B uppermost; the ejector, the guess-board and duplicate color pegs and gilt pegs from the host's peg-box will also be used. The host will pass the peg-box around and each player will take from the host's peg-box a duplicate color-peg of his color and a gilt-peg. The guess-board will then be passed around and each player will place his duplicate color-peg in the hole of the guess-board indicating his guess as to the total indicated by the position of the balls in the pit, following each player's turn with the ejector. This guess of the respective players remains the same throughout the second stage of the game.

Following each player's turn with the whose guess is
will place his gilt
color in the "once
. If there be two play-
equally nearly correct,
gilt peg accordingly in
his group. If any player
guess, or is nearest correct
transfer his gilt-peg to his
the zone marked "twice best
title him to score five
. If any player comes
in twice, he will be
entitled           points on the game-
field for each           twice-best.
If at any t            s in the pit spell the
word excitemen            ayer whose turn at
the ejector produces       will receive 15 points
in counting discs from each of the other
players.

*Third stage.*—The ball-fountain and its
full complement of twenty-five balls will be
used. The first player will shake and invert
the ball-fountain and operate the slide to
admit the balls into the tube and will set the
ball-fountain upright and ascertain the total
count of the numbers on the balls visible in
the tube and will then advance his color-peg
accordingly on the game-field. If the colors
of the balls visible in the tube are all differ-
ent it will be known that the balls spell ex-
ci-te-me-nt, and in that case he will also re-
ceive fifteen points in counting discs from
each of the other players. And so on for
each player in succession.

*Fourth stage.*—Will be played with cards.
The host will deal one card at a time until
five cards have been dealt to each player.
The top card of the remainder of the deck
will be placed, face up, beside the deck and
termed "discard". The first player to the
left of the host will draw either the top card
from the deck or a card face up in the dis-
card and in exchange will deposit a card
from his hand face up, on the discard pile.
Each player will in like manner draw and
discard a single card. Each player will then
in turn score as follows on the game-field;
if his hand contains all cards of the same
color, or five cards of the same numeral, or
five cards in sequence such as one-two-three-
four-five, he will score five points in each
case. Any player whose hand contains none
of the above combinations will not score on
the game-field. If the cards in any player's
hand spell ex-ci-te-me-nt, he will receive
fifteen points in counting discs from each
other player.

The "joy" card in the hand of any player
will count as any color, any numeral or any
two letters of the word excitement desired
or required by the holder, in making a se-
quence; all of one color; all of one numeral;
or "excitement".

*Fifth stage.*—The "jaz-r-et" box and its
twenty-five jaz-r-ets will be used. The host
will shake the box to mix the jaz-r-ets and
will hand it to the player at his left. The
player will draw five jaz-r-ets from the box
and score on the game-field with his color-
peg the total number of points indicated by
the jaz-r-ets drawn. If the jaz-r-ets drawn
spell ex-ci-te-me-nt he will also receive
fifteen points in counting discs from each of
the other players. He will then return the
jaz-r-ets to the box, shake it and pass it to
the next player; and so on for each player
in succession.

*Sixth stage.*—The thrill-box, its lettered
cubes and its numbered cubes will be used.
The player at the left of the host will re-
ceive the box, shake it, and invert it to dis-
play "Let's go". The ejector having been
removed from the pit, he will place the
thrill-box right side up in the pit where it
can be seen by all and will open it to dis-
play the cubes. He will then advance his
color-peg on the game-field the number of
points indicated by the total numbers of
the displayed faces of the numbered cubes.
If the exposed faces of the lettered cubes
spell ex-ci-te-me-nt he will also receive fif-
teen points in counting discs from each other
player. And so on for each player in suc-
cession. The game will conclude by each
player giving ten points in counting discs
to the player having the highest score on
the game-field five points to the player hav-
ing the highest score on the game-field and
five points, as consolation to the player hav-
ing the lowest score on the game-field. In
case of a tie, or ties on the game-field, the
players tying for first place will decide same
by continued use of the thrill-box, as fol-
lows: they will shake the box, in succession,
until one of them has shaken a total amount,
on the numbered cubes in excess of the other
player or players tied for high place; and
the next highest will take second place. If
there be no tie for first place, but a tie
for second place, the second place will be
determined in the same manner by the play-
ers tied for second place. A tie for low-
place will be determined in the same man-
ner, except that the low shake on the tie
will prevail instead of the high shake. The
final winner of the game will be the play-
er who has the greatest number of points
in counting discs. If the game is being
played progressively, the two players at each
table having the greatest number of points,
in counting discs will progress to the next
table, at the close of each game.

Figure 3:
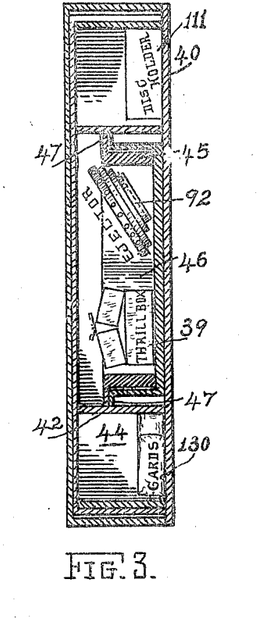
Fig. 3 is a sectional diagram not to scale, illustrating the stowing of some of the appurtenances in the box.
Figure 4:
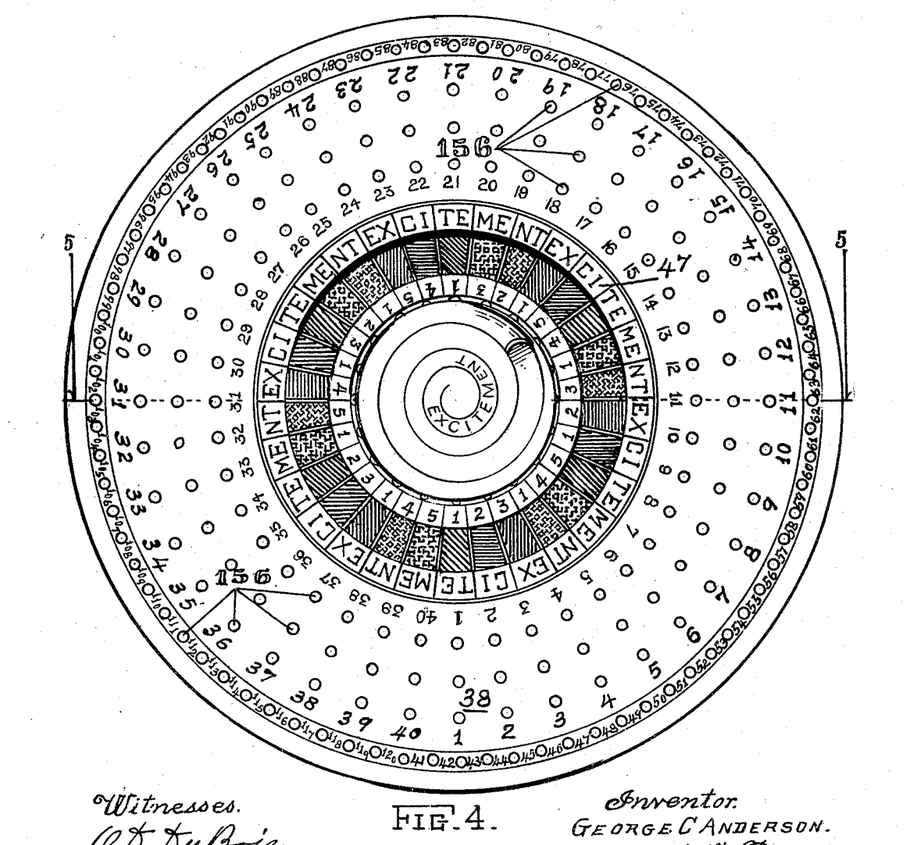
Fig. 4 is an enlarged top plan of the apparatus, without the instruments, showing the relation of the game-field, the excitement-pit and the ejector.
Figure 5:
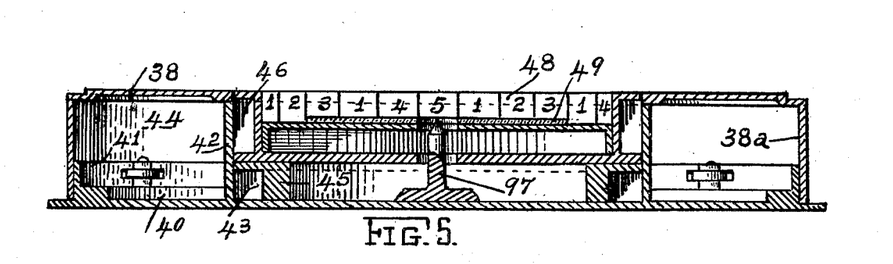
Fig. 5 is a vertical section on the line 5—5 of Fig. 4 showing the base, the game-field and the pit without the ejector.

No claim is made relative to the dis-
posal of the inserted ring 45 and the ap-
purtenances 39 and 92 in the box, in the
positions relative to each other, indicated
diagrammatically in Fig. 3.

Having fully described my invention what I claim as new and desire to secure by Letters Patent is:

1. In a game apparatus, the combination of a base having a central circular chamber; a pit in said central chamber, having on its upper rim a series of groups of letters, the letters in each group spelling "ex-ci-te-me-nt" and having on its inner wall a series of groups of numerals, each group comprising six numerals, and having on its floor radial corrugations separated by spaces; balls usable in the pit; and a rotative ejector delivering said balls into the pit, the balls stopping in spaces on the pit floor which at different times correspond to letters "E X" "C I" "T E" "M E" "N T" to spell the word "excitement", which has a counting value in counting discs.

2. In a game apparatus, in combination with a base having a central chamber, a pit in said chamber, a spiral ejector rotative in the pit and having an opening admitting balls into the interior of the ejector, and a sweep striking the balls to disperse them in the pit.

3. In a game apparatus, the combination of a base having a central chamber; a pit in said central chamber; and a ring in said chamber normally supporting the pit in operative position when in use; balls usable in the pit at values determinable by the numerals and letters on the pit and an ejector delivering said balls into the pit.

4. A reversible disc for game apparatus having on its obverse face a circular series of numerals in five groups, each group comprising the numerals, 1, 2, 3, 1, 4, 5, and having on its reverse face a circular series of numerals contained in thirty sectors in which the numeral 10 occurs seven times, the numeral 1 occurs seven times, and the respective numerals 2, 3, 4, 5, 6, 7, 8 and 9 occur twice; in combination with a pit having on its floor radial spaces corresponding to the sectors on the faces of the disc and having on its inner vertical wall a circular series of numerals corresponding to the numerals on the obverse face of the disc; balls usable in the pit; and a rotative ejector ejecting into the pit balls coming to rest in the spaces on the pit floor and having counting values determined by the numerals on the obverse face of the disc, supplementing the numerals on the inner circular wall of the pit, to facilitate the counting of the values of the balls in the pit.

5. In a game apparatus, the combination of a pit having a series of value-numerals; an ejector rotative in the pit; balls deposited in the pit by the rotating ejector and counting in values determined by the values on the pit wall; and a reversible disc having on one side numerals corresponding to the numerals on the pit wall and auxiliary thereto, to facilitate the reading of the count of each play in the pit.

6. In a game apparatus, the combination of a cup-like pit having a circular series of groups of numerals on its inner wall, a circular series of groups of letters on its rim and a series of radial corrugations on its floor; a number of balls usable in the pit in the spaces between the corrugations thereof, and having values to be scored on the game-field, determined by the numerals on the wall of the pit, and receiving counting values, payable in counting discs, according to the positions of the balls relative to the letters on the pit.

7. In combination with a numbered and lettered pit; a rotative ejector depositing balls in the pit, a disc in the pit having on one face numerals corresponding to the numerals on the inner wall of the pit, and having on its other face sectors corresponding to the sectors of the pit; and having counting values of from five to fifty inclusive; a perforated game-field surrounding the pit; color-pegs identifying each player and engaging in perforations on the game field to indicate his score on the game-field; a guess-board comprising a zone of numbered and perforated areas; a first color zone comprising perforated color areas, and a second color zone comprising perforated color areas, the same as the color areas of the first color zone; duplicate color pegs indicating each player's guess on the numbered zone; gilt pegs indicating each player's "once-best" guess in his color area in one color zone; also indicating in his color area his "twice-best" guess on the other color zone.

8. In a game apparatus, in combination with a pit having letters, combinations of which spell a characteristic word, also having colors which indicate at a glance if the characteristic word is spelled, and a rotating ejector, ejecting balls into the pit, said balls occasionally stopping in position to spell the characteristic word.

9. In a game apparatus, in combination with a pit having groups of letter values spelling a characteristic word, groups of numerical values, and groups of color values; a rotating ejector, ejecting balls into the pit, each ball coming to rest, on a color in the pit, to indicate at a glance that the characteristic word is spelled.

10. In a game apparatus, in combination with a pit having a series of groups of numerals, the several groups comprising the same numerals arranged in the same order in each group; a plurality of balls; a rotative ejector depositing the same number of balls in the pit upon each rotation of the ejector; a reversible pit-disc having on one face the same number of groups of the same numerals arranged in the same order as the numerals on the pit, to designate the count of the numerals in the pit, and having on its other face a circular series of numerals recurring with different frequencies, to designate other and greater values of the same balls in the pit at each rotation of the ejector.

11. In a game apparatus, in combination with a pit having radial corrugations on its floor, also having a series of letters, said letters being arranged in pairs in accordance with the spaces between the corrugations on the pit floor, combinations of which spell a characteristic word; a pit-disc having sectors corresponding to the spaces between the corrugations of the pit; and the balls usable in the pit.

12. In a game apparatus, the combination of a game-field having a series of perforations, color-pegs identifying each player and indicating his score on the game-field; a guess board having a zone comprising numbered areas; a first color zone comprising color areas, identifying the respective players; a second, similar colored zone comprising color-areas, identifying the respective players; duplicate color pegs used to score each player's guess in the numbered zone; and host's gilt pegs used to indicate for each player in his color area, successful guesses in the color zones of the guess-board.

13. In combination, a game apparatus equipped with a game field, a guess board, and color pegs to identify the scores of respective players, on the game field, host's color pegs to designate the guesses of the respective players on the guess board, and host's gilt pegs adapted to indicate the "once-best" guess of a single player, the respective "once-best" guesses of a number of players, the "twice-best" guess of a single player, and the respective "twice-best" guesses of a number of the respective players on the guess board.

14. In combination, a guess-board, duplicate color pegs, and host's gilt pegs, usable by a number of players, said guess board comprising a flat top member having a numbered zone area perforated to receive players' duplicate color pegs identifying the guesses of the respective players; a "once-best" guess color-zone comprising a number of areas of colors corresponding to players' color pegs and having perforations to receive gilt pegs identifying the "once-best" guess of the respective players; a "twice-best" guess color-zone comprising areas of the same colors as the colors of the "once-best" color-zone, and having perforations to receive gilt pegs identifying the respective players making "twice-best" guesses.

15. In a game apparatus, in combination with a pit having letters, combinations of which spell a characteristic word, also having numerical values; a pit disc having on one face predetermined numerical values corresponding to the numerical values of the pit; a guess-board having a numbered zone; and means for indicating in said zone the guess of each player.

16. In a game apparatus having a distinctive name; the combination of a thrill box having a series of compartments designated by a series of letters in syllabic arrangement to spell said distinctive name; and cubes usable in said compartments and having color values, numerical values, and syllabic letter values serving to determine the spelling of said distinctive name according to the syllabic arrangement of the cubes.

17. A counting device for game apparatus, comprising a box having a series of compartments containing lettered cubes; a series of compartments containing numbered cubes; a cover member having a series of compartments covering the respective compartments containing numbered cubes; a cover member having a series of compartments covering the respective compartments containing lettered cubes; latches connecting said cover members; said box having on its bottom the inscription "Let's go" visible to all the players when the box is inverted and signifying that the cubes have been properly tumbled; each in its own compartment.

18. A counting device for game apparatus, comprising a weighted box having a series of compartments containing lettered cubes; a series of compartments containing numbered cubes; a cover member having a series of compartments covering the respective compartments containing numbered cubes; a cover member having a series of compartments covering the respective compartments containing lettered cubes; latches connecting said cover-members, and a weight designed to make the box stable; said box having on its bottom the inscription "Let's go" visible to all the players when the box is inverted and signifying readiness to proceed with the game.

19. A counting device for game apparatus, comprising a box having two series of parallel compartments; cover members complemental to the respective series of compartments in the box, hinged on the respective sides of the box, and each having a series of compartments corresponding to the respective compartments of the box.

20. A counting device for game apparatus, comprising a box having a first series of compartments and a second parallel series of compartments; a cover member hinged on one side of the box and having a series of compartments complemental to said first series of compartments of the box; and a second cover member hinged on the other side of the box and having compartments complemental to said second series of compartments of the box; latches connecting said cover members; and resilient connecting devices connecting the cover members with the box and effective to open the box upon release of said latches.

21. A container for counting devices, having a plurality of series of compartments; cover members, each having a series of compartments corresponding to one series of compartments of the box, lettered cubes contained in one series of compartments in the box; numbered cubes contained in another series of chambers of the box, each and every lettered cube, and each and every numbered cube being free to tumble in its chamber and in the corresponding chamber of its cover member.

22. In a cube container, the combination of a box comprising a base having two series of compartments; cover-members covering the respective series of compartments in the box and having chambers corresponding to the chambers in the box; and resilient latch members connected with the respective cover members, each having a depressing member of a color different from the color of the depressing members of the co-acting latch member, and having a terminal hook member colored on its upper face to correspond to the color of the opposite depressing member, to indicate at a glance to the user which depression member is to be used to disengage the latch members.

23. In a ball-fountain for game apparatus, the combination of a partitioned box; a slide sliding above the partitions of the box and having openings corresponding to the respective compartments of the box; a transparent view-tube carried by the slide and having compartments registering with the compartments of the box when the slide is at the limit of its inward travel; a plunger engaging the slide to move it inwardly and an elastic slide-actuating device stressed upon moving the slide inwardly and acting to move the slide outwardly.

24. In a game apparatus having a distinctive name of counting value, the combination of a receptacle having numerical designations and a series of letters in syllabic arrangement in the receptacle, each series spelling said distinctive name; in combination with utensils usable in said container and having numerical values determining the spelling of said distinctive name according to correspondence with said numerical indications in the container.

25. In a game apparatus, a numbered and lettered pit; a perforated game field surrounding the pit; a rotative ejector; balls deposited in the pit by the ejector; color pegs entering the perforations of the game field to identify each player, and score in turn, his numerical values of balls on the game field; and counting discs receivable by the player operating the ejector, from every one of his contestants whenever balls deposited in the pit lie in conjunction with letters on the pit, to spell a predetermined characteristic word.

26. In a game apparatus, having a numbered and lettered pit, a perforated game field surrounding the pit, color pegs entering the perforations of the game field to identify each player and score, in turn, his numerical values on the game field; in combination with, a ball fountain comprising compartments containing numbered and lettered balls; a view tube receiving balls from the respective compartments of the ball fountain; the letters on the balls in the view tube when all are of different colors being complemental to said colors, combine to spell a characteristic word, which has a value in the game in counting discs, in addition to the numerical values of the balls, counted on the game field.

27. A ball ejector for game apparatus comprising a hollow body in the form of a frustrum of a cone and having an intake opening and an outlet opening for balls, a spiral runway extending around the outside of the body and terminating in said intake opening, a central hub inside of the body and having a central depression, and a sweep integral with the body and approximately tangent to the hub and terminating adjacent to said outlet opening, in combination with a game field; a lettered and numbered pit central with respect to the game field; a stationary vertical pivot at the center of the pit and engaging in the conical depression in the hub of the ejector to support the ejector in the pit and permit free rotation of the ejector.

28. A ball ejector for game apparatus comprising a hollow body having an external spiral runway, also having an intake opening and an outlet opening for balls, balls traversing said run-way through said intake opening into the ejector; an internal sweep integral with the body and ejecting the balls through said outlet opening; a perforated game field; color-pegs identifying the player and entering the perforation in the game field; a pit central with respect to the game field and having color-designations, lettered designations and numbered designations, the values of which are determined by the position of said balls at rest in the pit.

29. In a game apparatus, the combination of a game-field having holes indicating counting values; counting pegs identifying different players, each peg having a terminal pin entering said holes, and each having a hollow to receive the terminal pin of another similar peg, to enable two or more players to occupy the same position on the game field when their scores happen to be identical.

30. In a game apparatus, the combination of a game-field with perforations; color pegs to engage in the perforations; cards having different color and letter values and different numerical values, certain combinations of which in a player's hand entitles him to score on the game-fields; and other combinations of which entitle him to values receivable in counting discs; and still other combinations of which entitle him to score both on the game-field and in counting discs.

31. In a game apparatus, the combination of a game field with holes; an ejector, a guess-board; cards; color pegs engaging in the holes in the game field, a ball-fountain containing balls of different color values, different letter values and different numerical values, forming combinations of different values indicated on the game field; and counting discs which indicate to each player, at a glance, by their colors and denominations, the score of each player, at any stage of the game by each player, determined by his use, in turn, of the ejector, the cards and the ball-fountain.

32. In a game apparatus, the combination of a game-field with perforations to receive pegs; a pit; a ball ejector ejecting balls into the pit; color pegs having terminal points engaging in the perforations of the game-field; a guess-board having perforations to receive duplicate color pegs and gilt pegs indicating counting values on the guess board, and counting discs of different colors and denominations which indicate at a glance each player's score at any time, as determined by his use in turn of the ejector and the guess-board.

33. In a game apparatus, the combination of a game field; a rotative ejector usable with the game field; a guess board having letter values, numerical values and color values; and cards having color values, letter values and number values combinations of which spell a characteristic word, said color, letter and number values being tallied on said game-field by color-pegs; and counting discs indicating each player's total number of points to his credit at any stage of the game, as determined by his use in turn, of the ejector, the guess-board and the cards.

34. In a game apparatus, the combination of a game field having color values, numerical values and letter values; a pit; an ejector associated with the game field; a guess board having color values, numerical values and letter values; counting discs having color values, numerical values, and letter values; color pegs in conjunction with said game field; cards having color values, letter values and number values, tallied on said game field by said color pegs; said counting discs indicating each player's total number of points to his credit at any stage of the game as determined by his use, in turn, of the ejector, the guess board, and the cards combinations of which spell a characteristic word on said game field.

35. In a game apparatus, the combination of a game-field with perforations; color pegs entering said perforations; pivoted discs, groups of which have color, number and letter counting values on the game-field and also have values in counting discs; and counting discs of different colors and denominations indicating at a glance, at any time, each player's status in the game.

36. In a game apparatus, the combination of a game field with perforations; an ejector usable with the game field; color pegs engaging in the perforations in the game field; a ball fountain; balls usable in the ball fountain and in the ejector and having numerical values, color values and letter values; cards having color values, numerical values and plus and minus values; a thrill-box with number cubes and letter cubes having counting values on the game field and counting values in counting discs; counting discs of different colors and denominations which at all times indicate to each player his score at any stage of the game; and also indicate at a glance the respective scores of each of the other players, determined by their use, in turn, of the ejector, the guess board, the cards, the ball fountain, the elective counting devices, and the thrill-box.

37. In a game apparatus, the combination of a game-field, with perforations; color pegs engaging in said perforations; a ball-fountain containing balls, groups of which have number values, which score on the game-field and color and letter values which score in counting discs; and counting discs of different number color and letter values which indicate at a glance each player's score at any stage of the game.

38. A counting unit for game apparatus, comprising two members face to face, each having a depression in its face; a pivot connecting said members; handles operating said members; and color discs in the respective depressions of said members and having a counting value for color.

39. A counting unit for game apparatus, comprising two members face to face, each having a depression in its face; a pivot connecting said members; numbered discs in the depressions of said members and having counting values determined by said numerals.

40. A group of counting units each unit comprising two members face to face, each member having a depression in its face; pivots connecting the members of each unit; and numbered and lettered discs located in the respective depressions in the faces of the members of all the units associated in said group, the numerals on said discs having a cumulative counting value and the letters on said discs having a counting value determined by a possible combination of said letters to spell a predetermined characteristic word.

41. A counting unit for game apparatus comprising flat members face to face, each member having a depression in its face; value indicators in the respective depressions and thereby protected from abrasion; a pivot connecting said flat members; and handles on said flat members effective to spread them away from each other upon pressing the free ends of said handles towards each other.

42. In a ball-fountain for game apparatus, the combination of a container having five compartments; a group of five balls in each compartment, the balls of each group being each of a different color, numbered one to five inclusive and bearing the letters EX-CI, TE, ME, and NT respectively; a transparent tube in communication with the container and adapted to accommodate five balls at a time, one from each compartment of the container; a plunger acting to slide the tube inward; a resilient tube-moving device adapted to move the tube outward carrying exposed balls, and when stressed by pressure on the plunger, moving the tube to drop the balls into their respective compartments.

43. In a game apparatus, the combination of a box having a double series of compartments, in registration, adapted to contain cubes, one cube to each pair of registering compartments admitting of thorough tumbling of each cube in its respective compartment, and means to hold some cubes stationary in their respective compartments while the other cubes are tumbled.

44. In a game apparatus, the combination of a plurality of registering compartment cube containers; a plurality of cubes having color, values, letter values and numerical values combinable to form combinations of various values in colors, letters and numerals, and to spell a characteristic word.

45. In a game apparatus, the combination of a cube container having a plurality of registering compartments; a plurality of cubes of different colors on their different faces which have color values combinable to form combinations of colors; and a means on the container of holding some of the cubes stationary while other cubes are being tumbled.

46. In a game apparatus, the combination of a cube container having a plurality of registering compartments; a plurality of cubes having different color values and different letter values combinable to form different combinations in colors, and to spell a characteristic word.

47. A game apparatus having a distinctive name and comprising a game field having numbered perforations; color pegs engaging in said perforations and cards usable with and scoring on said game field by said color pegs, said cards having numerical values, letter values and color values combinable to spell said distinctive name.

48. In game apparatus, the combination of a game field having numbered perforations; color pegs each of different color, identifying the players; a guess board having numbered perforations and colored perforations; duplicate color pegs and gilt pegs adapted to enter the perforations of the guess board.

49. In game apparatus the combination of a game field having perforations of numerical values; color pegs each of different color identifying the players and their relative positions on the game field; counting discs which by their color and denomination show at a glance the status of each player, and counting disc holders of colors the same as the color pegs identifying the players at their positions around the game.

50. In a game apparatus having a distinctive name of counting value, the combination of a receptacle having a number of series of letters in syllabic arrangement in the receptacle, each series spelling said distinctive name; in combination with utensils usable in said container and having syllabic values determining the spelling of said distinctive name according to correspondence with the syllabic designations in the container.

51. In a game apparatus, the combination of cards having numerical values, letter values and color values, forming combinations of different values in numerals, letters and colors, and combinable to spell a characteristic word; a game field having perforations of numerical value; color pegs entering the perforations on the game field to indicate the different players' scores with the cards, and counting discs receivable from each of the other players by any player in his turn forming a combination of cards in his hand which spell a characteristic word, and counting disc holders of colors the same as the color pegs establishing the identity of the respective players.

52. In a game apparatus the combination of a ball fountain having a base with partitions; a sliding tube with transparent top having partitions registering with the partitions of the base; a plunger and spring actuating device operating the sliding tube to admit of balls entering the tube from the base; a number of balls having color, letter and numerical values, and combinable to spell a characteristic word, balls passing from the base into the tube exposing five at a time and returning to the base by operation of the sliding tube; a game field with perforations having numerical value; and color pegs each of different color identifying the different players and scoring their respective counts with the ball fountain and balls, by entering their respective perforations in the game field.

53. In a game apparatus, the combination of a game field with perforations; a ball ejector and balls which has on its upper outside face a spiral runway terminating in an outlet opening depositing the balls through the top into the bottom or inside of the ejector which is depressed having an outside circular wall, and a sweep arm which ejects the balls through an opening in the circular wall; a pit having corrugations which separate spaces having color, letter, numerical and spelling values which receive the balls from the ejector and color pegs each of different color identifying the players and adapted to enter the perforations on the game field indicating the respective players' score with the ejector and balls.

54. In a game apparatus, the combination of a cube container having a number of registering compartments, each compartment containing a cube which tumbles in its own compartments independently of the other cubes; a number of cubes having numerical color, letter and characteristic word values; and means for preventing some of the cubes from tumbling while the others tumble.

55. In a game apparatus, the combination of a cube container having a number of registering compartments; each compartment adapted to contain one cube and tumble it independently of the other cubes; a number of cubes having color, numerical, letter and spelling values; means for tumbling all the cubes at once, and means for holding some of the cubes stationary while others tumble.

56. In a game apparatus, the combination of a game field having perforations; elective counting devices associated in pairs, each unit of a pair having a color value, a letter value and a numerical value; and color pegs of different colors, identifying the different players and engaging in the perforations in the game field to indicate the scores of the different players, after their respective turns with the elective counting devices.

57. In a game apparatus having a characteristic name, the combination of a gamefield having perforations of numerical values, color pegs adapted to enter said perforations to indicate the scores of the different players; counting discs of different colors and denominations receivable by players who have operated the apparatus to spell said characteristic name, and a series of cards having color, letter, numerical, spelling, and plus and minus values; combinations of which have values on the gamefield and other combinations of which have values in counting discs.

58. A game apparatus having a distinctive name; comprising a pit having a series of letters in syllabic arrangement, the letters of the series spelling said distinctive name; an ejector rotative in said pit; and balls having syllabic letter values, said balls ejected by said ejector and stopping in said pit in positions to spell said distinctive name.

59. A game apparatus having a distinctive name; comprising a pit having a number of series of letters in syllabic arrangement, said pit having color values and numerical values; an ejector rotative in said pit; and balls having syllabic letter values, color values and numerical values, determining the spelling of said distinctive name, according to the positions of the ejected balls in the pit.

60. In a game apparatus having a distinctive name of counting value, a receptacle having color indications and a series of letters in syllabic arrangement spelling said distinctive name in combination with utensile usable in said container and having color designations determining the spelling of said distinctive name according to correspondence in color with the color indications in said container.

61. A game apparatus having a distinctive name of counting value and comprising a container having a number of series of colors, a number of series of numerals, and a number of series of letters, each series of letters spelling said distinctive name; and utensils usable in said container, each utensil having a color value, a numerical value and a letter value, determining the spelling of said distinctive name in co-ordination with the colors, the numerals, and the letters on said container.

In witness whereof I have hereunto signed my name at Springfield, Illinois, this 16th day of February, 1924.

GEORGE C. ANDERSON.